US012299835B1

(12) United States Patent
Lyu et al.

(10) Patent No.: US 12,299,835 B1
(45) Date of Patent: May 13, 2025

(54) SHARED SCENE CO-LOCATION FOR ARTIFICIAL REALITY DEVICES

(71) Applicant: Meta Platforms Technologies, LLC, Menlo Park, CA (US)

(72) Inventors: Wei Lyu, Santa Clara, CA (US); Shir Lene Lim, Kirkland, WA (US); Anush Mohan, San Jose, CA (US); Yuichi Taguchi, Los Gatos, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 111 days.

(21) Appl. No.: 18/069,029

(22) Filed: Dec. 20, 2022

Related U.S. Application Data

(60) Provisional application No. 63/380,602, filed on Oct. 24, 2022.

(51) Int. Cl.
*G06T 19/20* (2011.01)
*G06T 7/70* (2017.01)

(52) U.S. Cl.
CPC .............. *G06T 19/20* (2013.01); *G06T 7/70* (2017.01); *G06T 2219/2004* (2013.01)

(58) Field of Classification Search
CPC .... G06T 19/20; G06T 7/70; G06T 2219/2004
See application file for complete search history.

(56) References Cited

U.S. PATENT DOCUMENTS 9,964,409 B1 5/2018 Flint et al.
10,338,392 B2 7/2019 Kohler et al.
(Continued)

FOREIGN PATENT DOCUMENTS

EP 3419286 A1 12/2018
WO 2013155217 A1 10/2013
(Continued)

OTHER PUBLICATIONS

Balntas V., et al., "HPatches: A Benchmark and Evaluation of Handcrafted and Learned Local Descriptors," Computer Vision and Pattern Recognition (CVPR), Apr. 19, 2017, arXiv:1704.05939v1 [cs.CV], 10 Pages.

(Continued)

*Primary Examiner* — YuJang Tswei
(74) *Attorney, Agent, or Firm* — Potomac Law Group, PLLC; Dannon G. Allbee

(57) ABSTRACT

Implementations described herein can share scene data between multiple artificial reality (XR) devices, such as head-mounted displays (HMDs). A first XR device can retrieve stored spatial anchors associated with a scene, and align a coordinate frame with coordinate frames for a second XR device using the spatial anchors. The second XR device can have identified physical objects in the scene with corresponding object types defined in a scene lexicon (e.g., with a camera on the second XR device capturing images of physical objects and performing object recognition or through manual tagging of objects with object types), and store the object types and locations of the physical objects as scene data. The first XR device can obtain the scene data based on associations between the scene data and the spatial anchors and render virtual objects using the scene data, without having to rescan the scene for the physical objects.

20 Claims, 10 Drawing Sheets

(56) References Cited

U.S. PATENT DOCUMENTS

| | | |
|---|---|---|
| 10,346,623 B1 | 7/2019 | Brandwine et al. |
| 10,466,953 B2 | 11/2019 | Eade et al. |
| 10,657,701 B2 | 5/2020 | Osman et al. |
| 10,740,613 B1 | 8/2020 | Sinclair |
| 11,132,827 B2 | 9/2021 | Gladkov et al. |
| 11,551,403 B2 | 1/2023 | Gladkov et al. |
| 11,727,655 B1* | 8/2023 | Monaghan ............... G06T 19/20 345/419 |
| 11,829,595 B1* | 11/2023 | Aggarwal ............... G06F 30/13 |
| 11,847,748 B2 | 12/2023 | Liu et al. |
| 12,008,806 B2 | 6/2024 | Bluzer et al. |
| 2005/0249426 A1 | 11/2005 | Badawy |
| 2012/0154557 A1 | 6/2012 | Perez et al. |
| 2014/0267234 A1 | 9/2014 | Hook et al. |
| 2014/0354685 A1 | 12/2014 | Lazarow et al. |
| 2014/0375688 A1 | 12/2014 | Redmann et al. |
| 2015/0271136 A1 | 9/2015 | Farris |
| 2016/0364912 A1 | 12/2016 | Cho et al. |
| 2017/0053442 A1 | 2/2017 | Sumner et al. |
| 2017/0243403 A1 | 8/2017 | Daniels et al. |
| 2017/0337749 A1 | 11/2017 | Nerurkar et al. |
| 2017/0345167 A1 | 11/2017 | Ard et al. |
| 2018/0053329 A1 | 2/2018 | Roberts et al. |
| 2018/0122139 A1 | 5/2018 | Janzer et al. |
| 2018/0144547 A1 | 5/2018 | Shakib et al. |
| 2018/0232937 A1 | 8/2018 | Moyer et al. |
| 2018/0286116 A1 | 10/2018 | Babu J D |
| 2018/0307311 A1 | 10/2018 | Webb et al. |
| 2019/0108578 A1 | 4/2019 | Spivack et al. |
| 2019/0114802 A1* | 4/2019 | Lazarow ............... H04W 56/001 |
| 2019/0197339 A1 | 6/2019 | Han et al. |
| 2019/0236842 A1 | 8/2019 | Bennett et al. |
| 2019/0287311 A1 | 9/2019 | Bhatnagar et al. |
| 2019/0340836 A1 | 11/2019 | Lynen et al. |
| 2019/0369836 A1 | 12/2019 | Faulkner et al. |
| 2019/0370994 A1 | 12/2019 | Norris et al. |
| 2019/0371279 A1 | 12/2019 | Mak |
| 2019/0377473 A1 | 12/2019 | Osman et al. |
| 2019/0392212 A1 | 12/2019 | Sawhney et al. |
| 2020/0004759 A1 | 1/2020 | Brebner |
| 2020/0019295 A1 | 1/2020 | Spivack et al. |
| 2020/0036816 A1 | 1/2020 | Babu J D et al. |
| 2020/0066046 A1 | 2/2020 | Stahl et al. |
| 2020/0066047 A1 | 2/2020 | Karalis et al. |
| 2020/0099954 A1 | 3/2020 | Hemmer et al. |
| 2020/0111255 A1* | 4/2020 | Brodsky ............... G06F 3/011 |
| 2020/0175764 A1 | 6/2020 | Romea et al. |
| 2020/0250879 A1 | 8/2020 | Foster et al. |
| 2020/0364901 A1 | 11/2020 | Choudhuri et al. |
| 2020/0367970 A1 | 11/2020 | Qiu et al. |
| 2021/0056762 A1 | 2/2021 | Robbe et al. |
| 2021/0283503 A1 | 9/2021 | Challinor |
| 2021/0304509 A1 | 9/2021 | Berkebile |
| 2022/0043446 A1 | 2/2022 | Ding et al. |
| 2022/0254207 A1 | 8/2022 | Billy et al. |
| 2022/0392104 A1 | 12/2022 | Zeng |
| 2023/0057203 A1 | 2/2023 | Hoagland |
| 2023/0315509 A1 | 10/2023 | Morgan et al. |
| 2023/0334752 A1 | 10/2023 | Gladkov et al. |
| 2024/0314179 A1 | 9/2024 | Lim et al. |

FOREIGN PATENT DOCUMENTS

| | | |
|---|---|---|
| WO | 2015192117 A1 | 12/2015 |
| WO | 2021010660 A1 | 1/2021 |
| WO | 2021188741 A1 | 9/2021 |

OTHER PUBLICATIONS

International Search Report and Written Opinion for International Application No. PCT/US2020/027763, mailed Jul. 23, 2020, 12 Pages.

International Search Report and Written Opinion for International Application No. PCT/US2022/052472, mailed Apr. 17, 2023, 11 pages.

International Search Report and Written Opinion for International Application No. PCT/US2023/011579, mailed May 17, 2023, 12 pages.

Morrison J. G., et al., "Scalable Multirobot Localization and Mapping with Relative Maps: Introducing MOARSLAM," IEEE Control Systems, vol. 36, No. 2, Apr. 1, 2016, pp. 75-85.

Mur-Artal R., et al., "ORB-SLAM: a Versatile and Accurate Monocular SLAM System," IEEE Transactions on Robotics, Sep. 18, 2015, arXiv:1502.00956v2 [cs.RO], 18 Pages, DOI: 10.1109/TRO.2015.2463671.

Non-Final Office Action mailed Aug. 18, 2023 for U.S. Appl. No. 18/150,954, filed Jan. 6, 2023, 29 pages.

Notice of Allowance mailed Sep. 7, 2022 for U.S. Appl. No. 17/447,902, filed Sep. 16, 2021, 12 pages.

Prosecution History of U.S. Appl. No. 16/576,367 dated Jan. 8, 2021 through Jun. 1, 2021, 49 pages.

Tian Y., et al., "SOSNet: Second Order Similarity Regularization for Local Descriptor Learning," Computer Vision and Pattern Recognition (CVPR), Dec. 16, 2019, arXiv:1904.05019v2 [cs.CV], 10 Pages.

* cited by examiner

SHARED SCENE CO-LOCATION FOR ARTIFICIAL REALITY DEVICES

CROSS REFERENCE TO RELATED APPLICATIONS

This application claims priority to U.S. Provisional Patent Application No. 63/380,602, titled "Shared Scene Co-Location for Artificial Reality Devices," which is herein incorporated by reference in its entirety.

TECHNICAL FIELD

The present disclosure is directed to shared scene co-location for artificial reality (XR) devices, such as head-mounted displays (HMDs), via spatial anchor sharing.

BACKGROUND

Artificial reality (XR) devices are becoming more prevalent. As they become more popular, the applications implemented on such devices are becoming more sophisticated. Augmented reality (AR) applications can provide interactive 3D experiences that combine images of the real-world with virtual objects, while virtual reality (VR) applications can provide an entirely self-contained 3D computer environment. For example, an AR application can be used to superimpose virtual objects over a video feed of a real scene that is observed by a camera. A real-world user in the scene can then make gestures captured by the camera that can provide interactivity between the real-world user and the virtual objects. Mixed reality (MR) systems can allow light to enter a user's eye that is partially generated by a computing system and partially includes light reflected off objects in the real-world. AR, MR, and VR experiences can be observed by a user through a head-mounted display (HMD), such as glasses or a headset.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
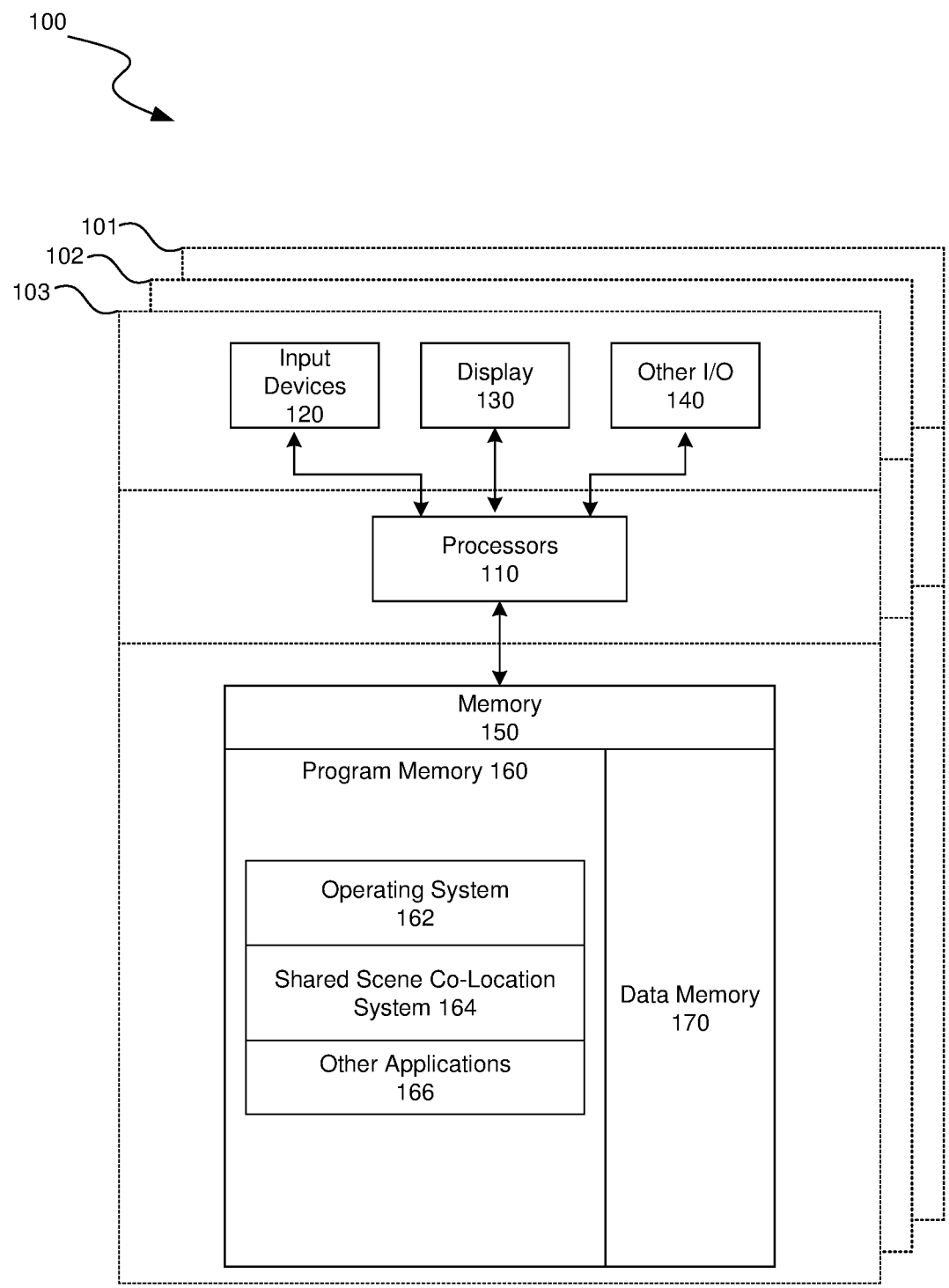
FIG. 1 is a block diagram illustrating an overview of devices on which some implementations of the present technology can operate.

Aspects of the present disclosure are directed to sharing scene data between multiple artificial reality (XR) devices, such as head-mounted displays (HMDs). via spatial anchor sharing. A first XR device can retrieve (e.g., from cloud storage) stored spatial anchors associated with a scene and align a coordinate frame with coordinate frames for a second XR device using the spatial anchors.

As multiple artificial reality devices are moved around real-world locations, they can scan those locations and define certain anchor points (e.g., at surfaces, edges, corners, doorways, etc.) These spatial anchors can specify a map of the world around that artificial reality device. These spatial anchors can then be stored to a centralized mapping service. When another artificial reality device is in a similar location, it can identify spatial anchors and also retrieve spatial anchors for that area from the mapping service. By aligning the one or more of the spatial anchors the artificial reality device has detected with the corresponding spatial anchors from the mapping service, the artificial reality device can identify itself within the map defined by the greater set of anchor points from the mapping service. Using this map, the artificial reality device can then track itself in the real-world area and ensure that virtual objects appear to stay at the same position and orientation within the scene (i.e., are world-locked). A second XR device scans the area to specify object locations and types within a defined scene lexicon (e.g., desk, chair, wall, floor, ceiling, doorway, etc.). This scene identification can be performed, e.g., through a user manually identifying a location with a corresponding object types or with a camera to capture images of physical objects in the scene and use computer vision techniques to identify the physical objects as object types. The system can then store the object types in relation to one or more of the spatial anchors defined for that area.

The first XR device can obtain the scene data either from a central system or from the second XR device. It can then render virtual objects with respect to the physical objects using the scene data (e.g., as an augmented reality (AR) or mixed reality (MR) experience), without having to rescan the scene for the physical objects itself. Thus, the implementations described herein can result in time savings, improved efficiency, and lower processing requirements for the first XR device.

For example, a user of a first XR device can go to a friend's house to play a multiplayer XR chess game. The friend, using a second XR device, could have previously scanned the living room in which she uses the second XR device to capture image data and location data (e.g., three-dimensional locations using a depth sensor) of physical objects within the living room. The second XR device can apply object recognition techniques to the image and location data to identify object types within the image data (e.g., walls, a coffee table, chairs, etc.), and use this information to generate scene data associated with the living room. This scene data can then be linked to particular spatial anchors mapping the space and allowing for an XR device to map itself into that space. Thus, when the friend launches the XR chess game, the second XR device can display the virtual chessboard on a suitable surface, e.g., the coffee table. When the first XR device enters the living room, the first XR device can retrieve the spatial anchors for the living room (allowing the first XR device to align its coordinate frame with coordinate frames of the second XR device) and obtain the scene data from the second XR device linked to the spatial anchors. Thus, when the user launches the XR chess game, the first XR device can display the virtual chessboard on the coffee table in the same location as it is positioned as seen by the second XR device, but from the viewpoint of the user of the first XR device. Thus, the first XR device can participate in the XR chess game with the second XR device, without itself having to scan the friend's living room to generate the scene data.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Several implementations are discussed below in more detail in reference to the figures. FIG. 1 is a block diagram illustrating an overview of devices on which some implementations of the disclosed technology can operate. The devices can comprise hardware components of a computing system 100 that can share scene data between multiple artificial reality (XR) head-mounted displays (HMDs) via associated spatial anchors. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, shared scene co-location system 164, and other application programs 166. Memory 150 can also include data memory 170 that can include, e.g., spatial anchor data, location data, coordinate frame data, scene data, object data, virtual object data, rendering data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
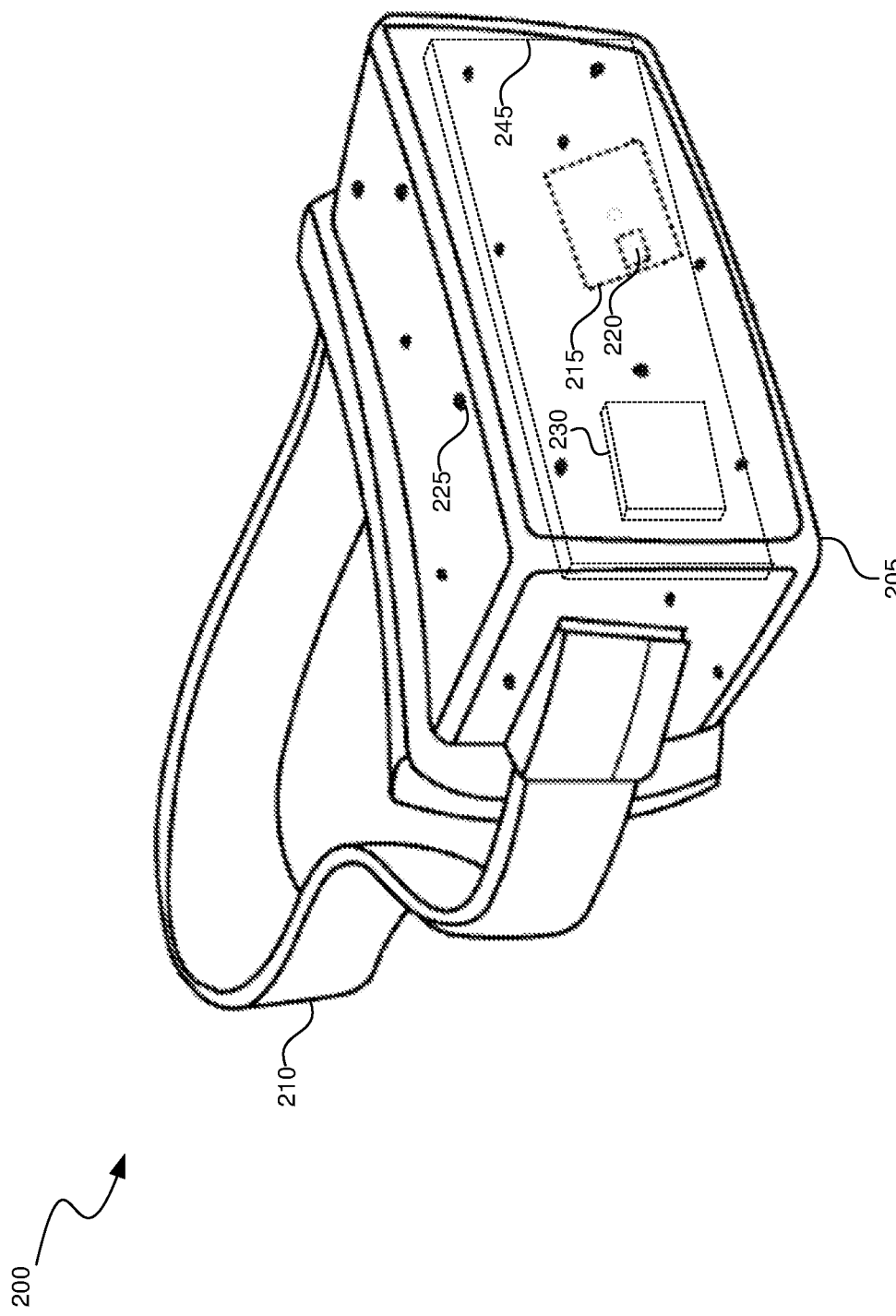
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
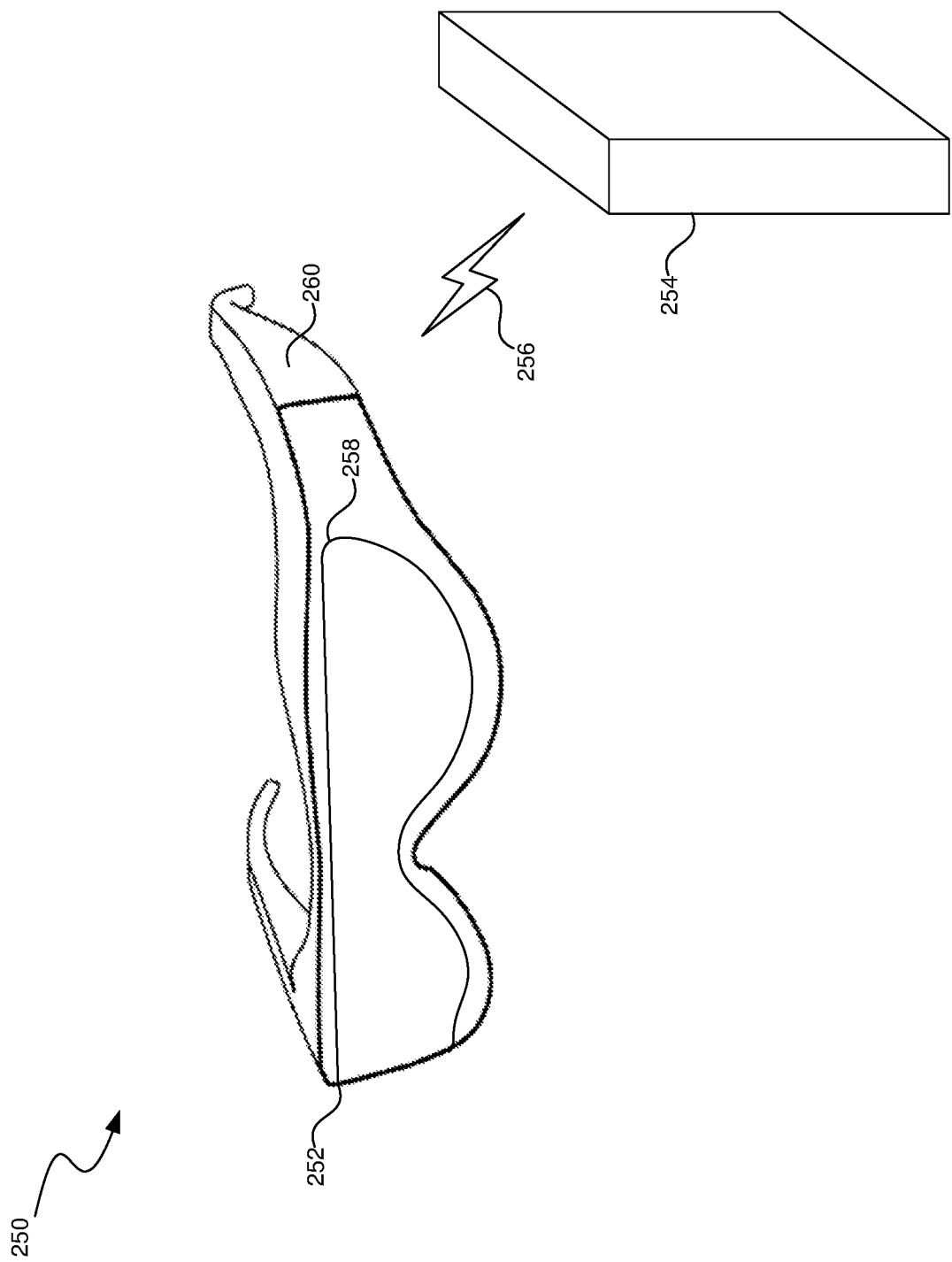
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
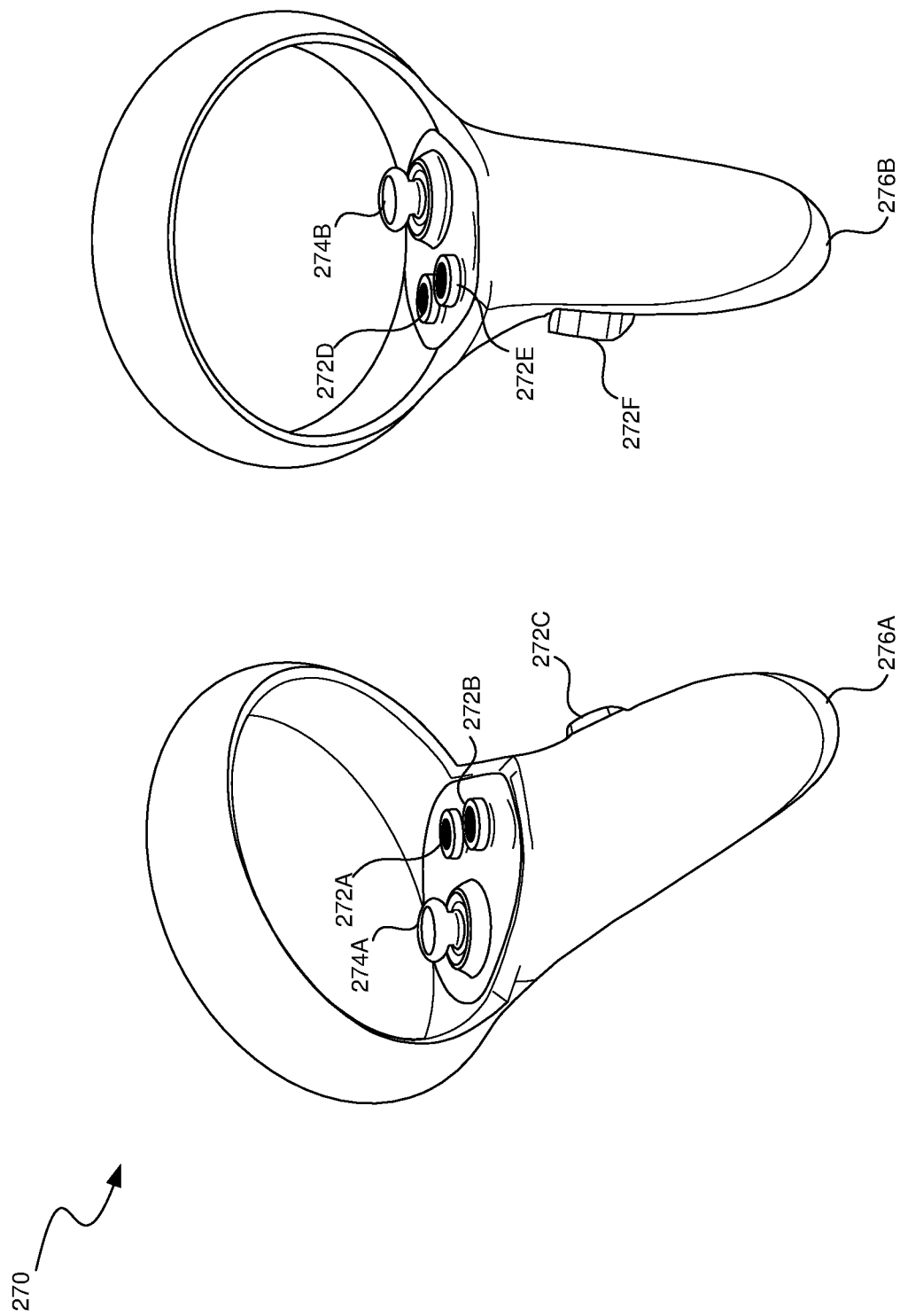
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
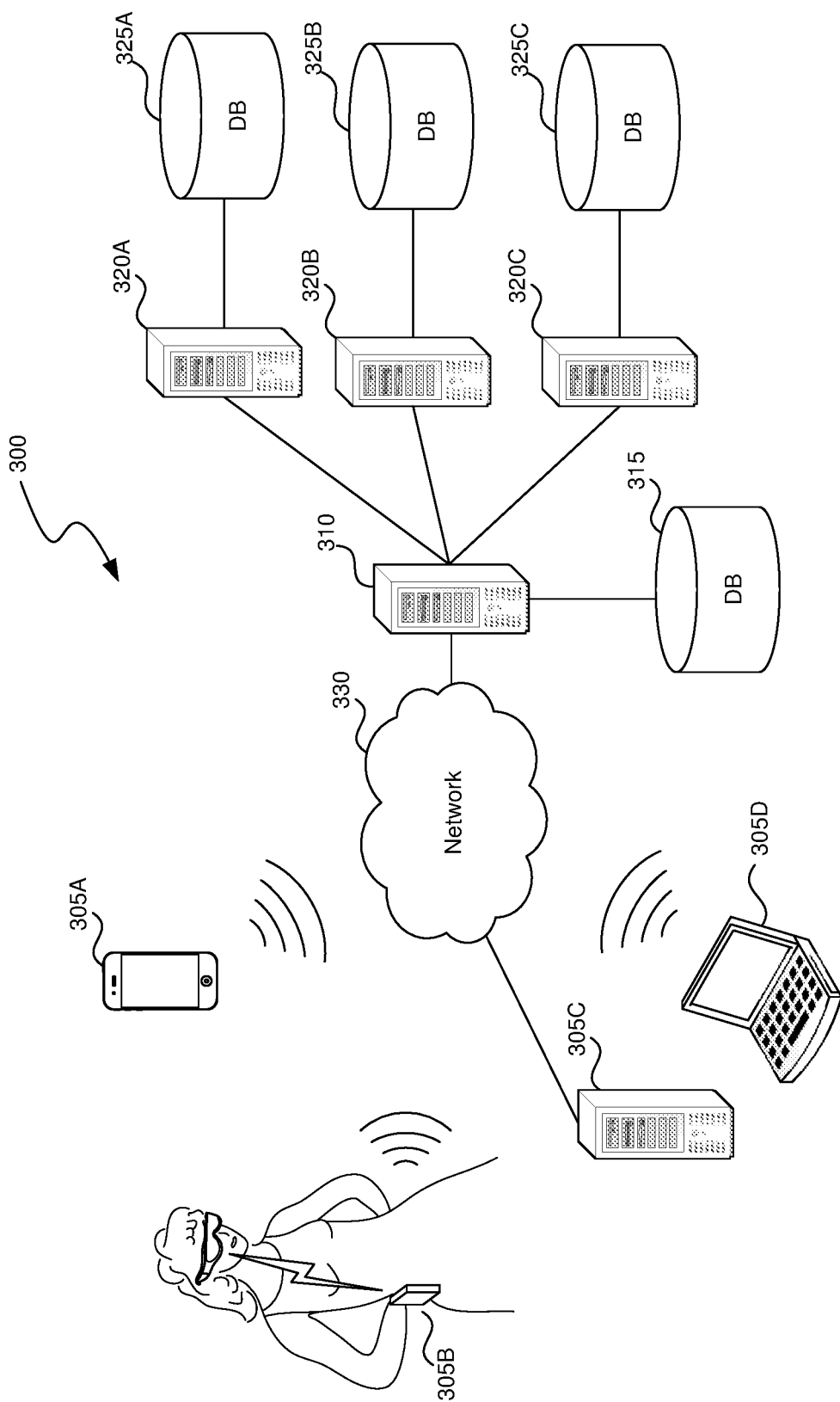
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
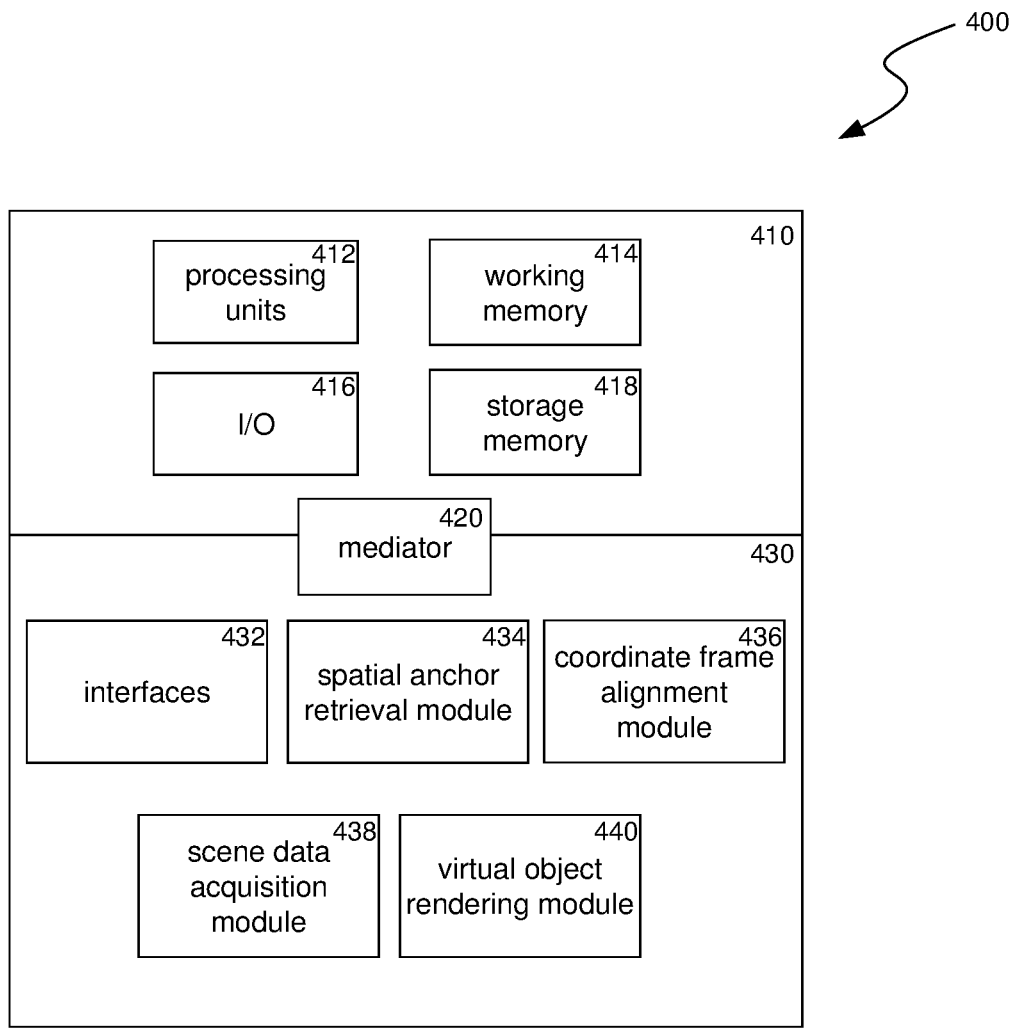
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for sharing scene data between multiple artificial reality (XR) head-mounted displays (HMDs). Specialized components 430 can include spatial anchor retrieval module 434, coordinate frame alignment module 436, scene data acquisition module 438, virtual object rendering module 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Spatial anchor retrieval module 434 can retrieve one or more spatial anchors defining mapping alignment points in a real-world environment. The one or more spatial anchors can each define a respective real-world location. In some implementations, the one or more spatial anchors can be pre-established (e.g., by an XR device previously mapping the real-world environment), stored on a cloud, and accessible by spatial anchor retrieval module 434 via a network, e.g., network 330 of FIG. 3. The one or more spatial anchors allow an XR device to consistently track its location—e.g., to then track location and consistently place virtual objects overlaid onto the scene appear to stay at the same position and orientation in space, i.e., are world locked. Further details regarding retrieving spatial anchors are described herein with respect to block 502 of FIG. 5.

Coordinate frame alignment module 436 can align a coordinate frame in the scene with coordinate frames for another XR device (e.g., an XR device previously accessing the scene) using the one or more spatial anchors. The coordinate frame can be a three-dimensional system that can include a set of points within the scene, e.g., corresponding to physical objects within the scene. Coordinate frame alignment module 436 can align its coordinate frame with coordinate frames for the other XR device such that virtual objects rendered in the scene can be displayed at the same location within the scene on both XR devices. Further details regarding aligning a coordinate frame with coordinate frames for another XR device using spatial anchors are described herein with respect to block 504 of FIG. 5.

Scene data acquisition module 438 can obtain scene data based on the associations between spatial anchors and the scene data. In some implementations, scene data acquisition module 438 can obtain the scene data from another XR device (e.g., an XR device previously accessing the scene). The other XR device can generate the scene data by storing object data associated with one or more physical objects in the scene, with reference to locations in the scene associated with the retrieved spatial anchors. The one or more physical objects can have an identified object type. In some implementations, the physical objects can be immoveable, i.e., permanent, such as doorways, walls, ceiling, floor, windows, cabinets, painting, posters, shelves, etc. (and can have corresponding type designations). However, in some implementations, it is contemplated that the physical objects can include moveable objects, such as a desk, a wardrobe, a table, a plant, a lamp, a screen, pen, phone, wallet, keys, etc. (and can have corresponding type designations). Further details regarding object recognition are described herein with respect to FIG. 7. Further details regarding obtaining scene data are described herein with respect to block 506 of FIG. 5.

Virtual object rendering module 440 can render one or more virtual objects in the scene with respect to the one or more physical objects on the aligned coordinate frame using the scene data. Because the coordinate frame is aligned with coordinate frames from another XR device previously accessing the scene, the one or more virtual objects can be displayed in the scene in the same position with respect to physical objects in the scene as they would be seen by the other XR device, without requiring components 400 to scan the scene. Further details regarding rendering virtual objects in a scene with respect to physical objects on an aligned coordinate frame are described herein with respect to block 508 of FIG. 5.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
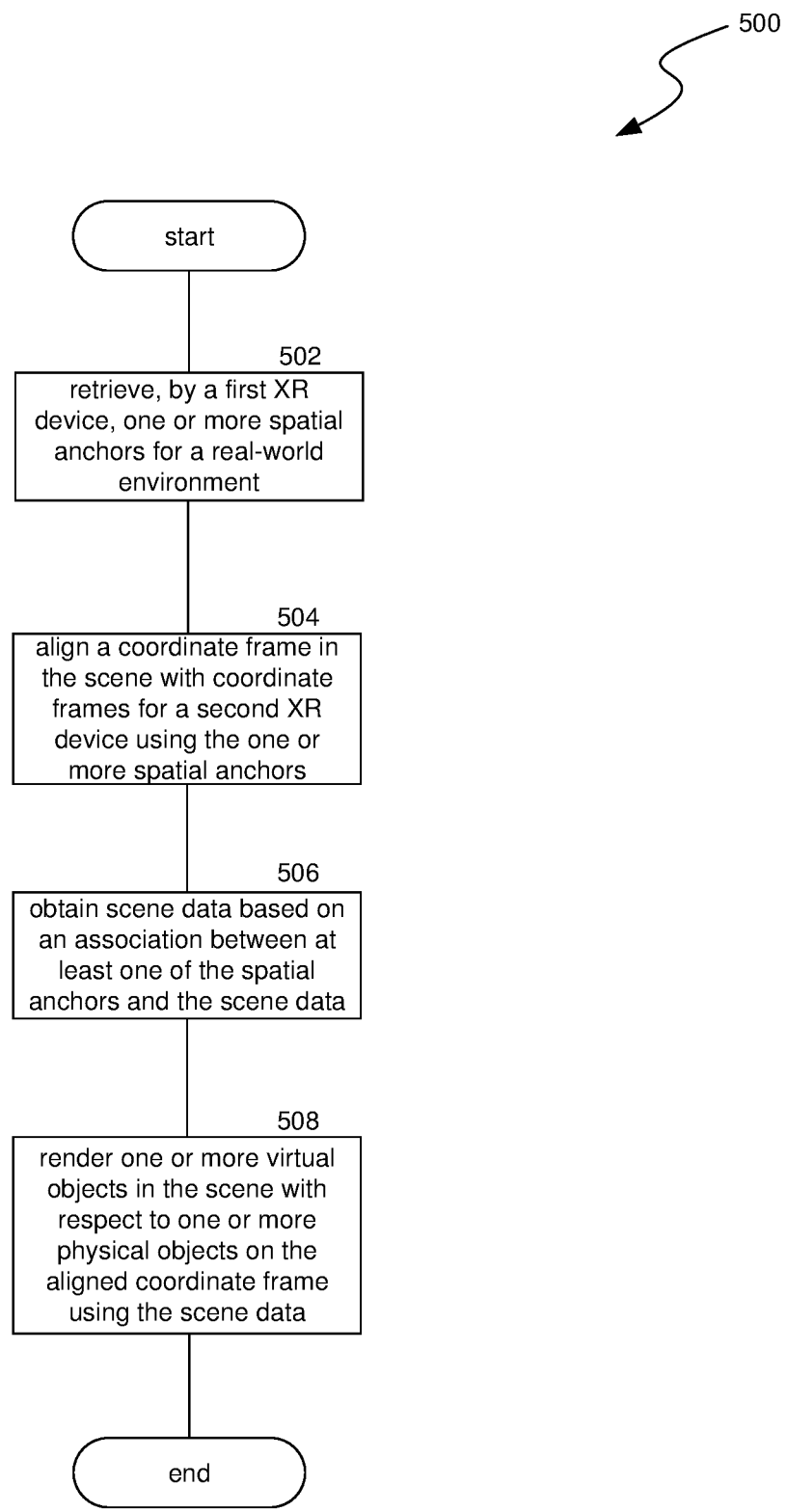
FIG. 5 is a flow diagram illustrating a process used in some implementations of the present technology for sharing scene data between multiple artificial reality (XR) devices.

FIG. 5 is a flow diagram illustrating a process 500 used in some implementations for sharing scene data, between multiple artificial reality (XR) head-mounted displays (HMDs), based on associations to spatial anchors. In some implementations, process 500 can be performed as a response to a user request via a first XR device to display an XR experience in a scene previously scanned by a second XR device. In some implementations, process 500 can be performed as a response to detection of a first XR device within a scene previously scanned by a second XR device. In some implementations, process 500 can be performed on a first XR device, such as an XR HMD. In some implementations, portions of process 500 can be performed by a first XR device, while other portions of process 500 can be performed by one or more other components of an XR system in operable communication with the first XR device, e.g., separate processing components. In some implementations, process 500 can be performed by shared scene co-location system 164.

At block 502, process 500 can retrieve, by the first XR device, one or more spatial anchors for a real-world environment. The one or more spatial anchors can each define a respective location automatically identified by one or more artificial reality devices. As multiple artificial reality devices are moved around real-world locations, they can scan those locations and define certain anchor points (e.g., at surfaces, edges, corners, doorways, etc.) These spatial anchors can define a map of the world around that artificial reality device. These spatial anchors can then be stored to a centralized mapping service. When another artificial reality device is in a similar location, it can identify spatial anchors and also retrieve spatial anchors for that area from the mapping service. By aligning the one or more of the spatial anchors the artificial reality device has detected with the corresponding spatial anchors from the mapping service, the artificial reality device can identify itself within the map defined by the greater set of anchor points from the mapping service. Using this map, the artificial reality device can then track itself in the real-world area and ensure that virtual objects appear to stay at the same position and orientation within the scene (i.e., are world-locked). In some implementations, process 500 can retrieve the one or more spatial anchors from a platform computing system or other server located on a cloud. In some implementations, the one or more spatial anchors can be previously established for the scene by a second XR device that previously accessed the scene, and can be uploaded to the cloud for storage and later access by other XR devices later accessing the scene, e.g., the first XR device.

In some implementations, at least one of the one or more spatial anchors is associated with scene data gathered by the second XR device. Upon accessing the scene, the second XR device can define scene data. In some cases, the second XR device can define the scene data by capturing one or more images of the scene, e.g., with cameras integral with or in operable communication with the second XR device and identify objects that have types matching types in a scene lexicon. In other implementations, a user can manually specify a location and a corresponding object type from the scene lexicon. Thus, the second XR device can identify one or more object types (e.g., walls, doors, windows, table, chairs, etc.) of a set of object types defined as scene components, each object type corresponding to a physical object in the one or more images of the scene. The second XR device can generate object data associated with the one or more physical objects having the one or more identified object types. The second XR device can further generate scene data by storing the object data with reference to the one or more locations in the scene, and associate the scene data with at least one of the one or more spatial anchors.

Figure 7:
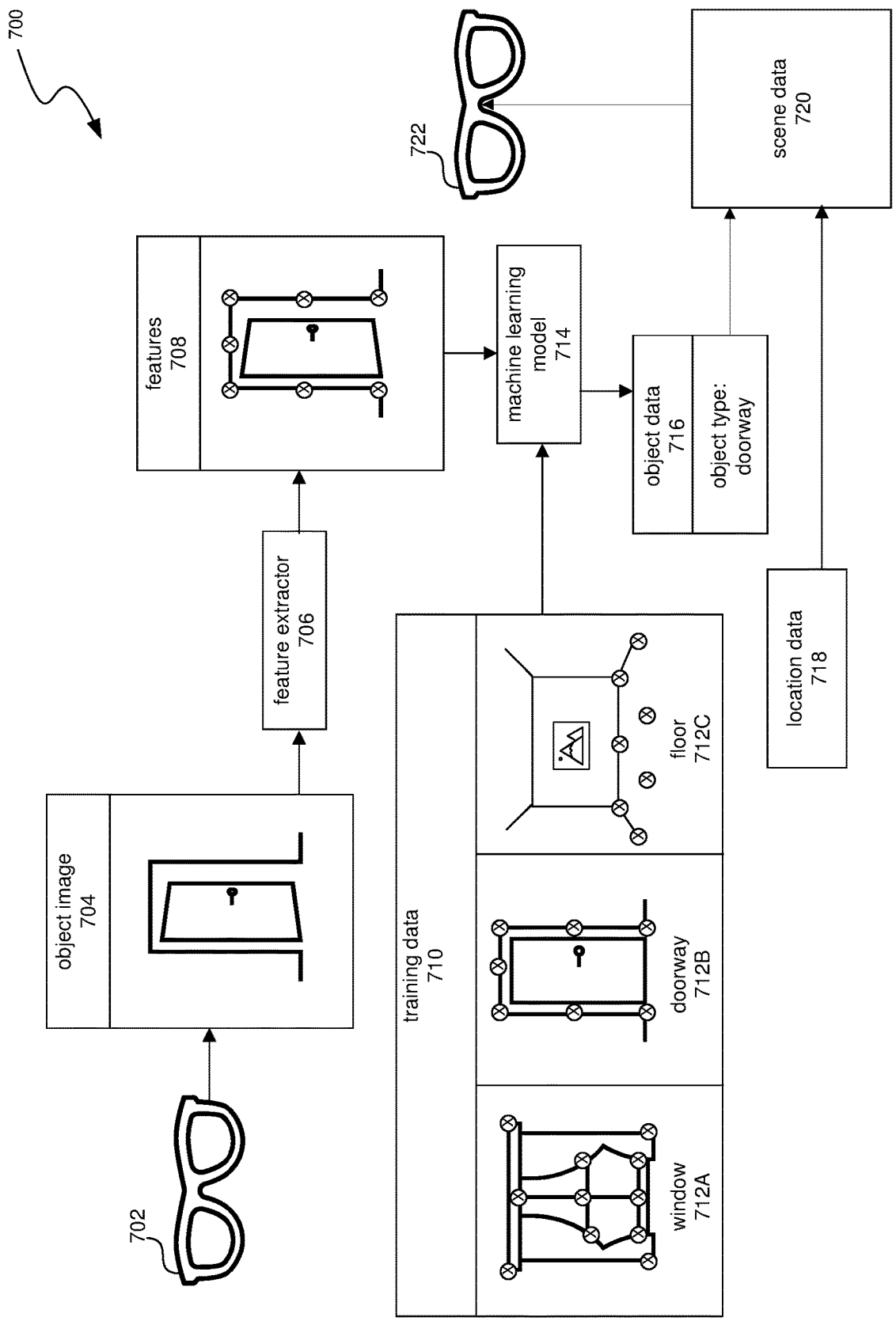
FIG. 7 is a conceptual diagram illustrating an exemplary flow for object recognition according to some implementations of the present technology.

In some implementations, the second XR device (or another component of an XR system in operable communication with the second XR device, e.g., a separate processing component) can identify the one or more object types from the one or more images by performing object recognition and/or computer vision techniques, as described further herein with respect to FIG. 7. In some implementations, a user of the second XR device (or another component of an XR system in operable communication with the second XR device, e.g., a separate processing component) can manually identify the one or more object types corresponding to the physical objects in the scene. For example, the user can place a controller (in operable communication with the second XR device) on various physical objects in a scene and audibly identify the object types (e.g., "this is a door," "this is a desk," etc.) and/or select the object types from a list displayed on the second XR device. In some implementations, the second XR device (or a separate component of an XR system in operable communication with the second XR device) can apply a machine learning model trained on images of known physical objects to predict the object types from the one or more images, then present the predicted object type to the user of the second XR device for confirmation and/or feedback. The second XR device can then update the model based on the feedback.

At block 504, process 500 can align a coordinate frame in the scene with coordinate frames for the second XR device using the one or more spatial anchors. For example, process 500 can use the one or more world-locked spatial anchors to define coordinates in three-dimensional space identifying the position of points within the scene. Process 500 can then align those coordinates with coordinate frames for the second XR device within the scene.

At block 506, process 500 can obtain the scene data based on the association between the at least one of the spatial anchors and the scene data. In some implementations, process 500 can obtain the scene data directly from the second XR device. In some implementations, process 500 can query the second XR device for any scene data associated with the retrieved spatial anchors. In some implementations, process 500 can obtain the scene data based on an application programming interface (API) call made by an application executing an XR experience that both the first XR device and the second XR device have launched. In some implementations, the second XR device can have provided the scene data, in association with spatial anchors, to a cloud service from which the first XR device can query to obtain the scene data.

At block 508, process 500 can render one or more virtual objects in the scene with respect to the one or more physical objects on the aligned coordinate frame using the scene data. In some implementations, the first XR device can render the one or more virtual objects in the same position as the one or more virtual objects rendered on the second XR device with respect to physical objects within the scene. For example, the first XR device and the second XR device can display a virtual ping pong game on a physical countertop from their respective locations and orientations, without the first XR device having to generate spatial anchors and rescan the scene for scene data associated with physical objects within the scene. Thus, the first XR device and the second XR device can participate in a multiplayer XR experience together with the virtual objects being rendered in the scene simultaneously by the first XR device and the second XR device. In other cases, the first XR device can render virtual objects, in relation to the scene data (e.g., on a wall, on the floor, on a countertop, etc.), not rendered by the second XR device.

Figure 6A:
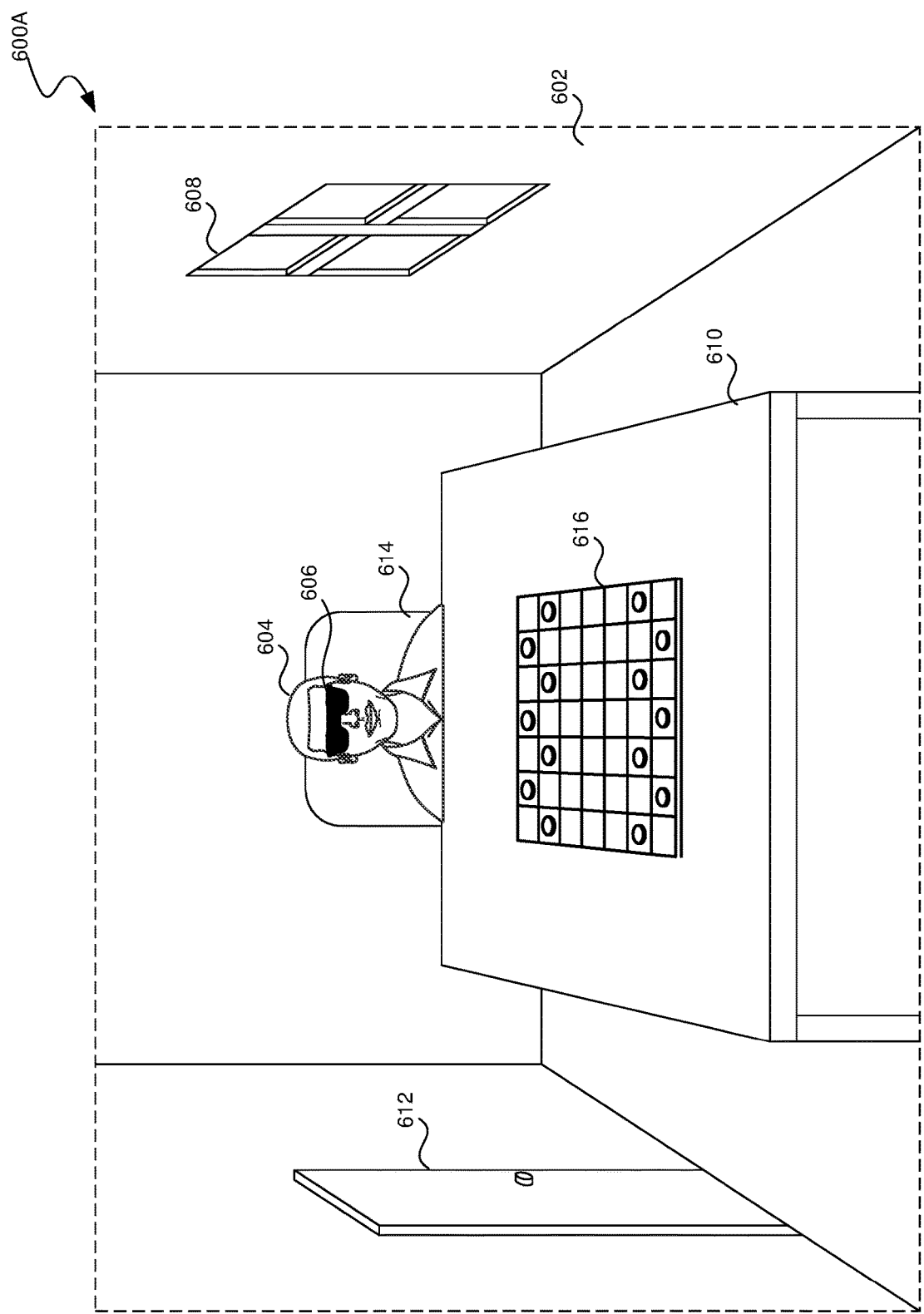
FIG. 6A is a conceptual diagram illustrating an example view from an artificial reality (XR) device that generated scene data corresponding to a scene in a real-world environment.

FIG. 6A is a conceptual diagram illustrating an example view 600A from an XR device (e.g., second XR device 620 of FIG. 6B) that generated scene data corresponding to a scene 602 in a real-world environment. Second XR device 620 can capture images of scene 602 by scanning scene 602 with a camera integral with the second XR device 620 or by identifying locations corresponding to where a user has placed a controller. The images can show physical objects 608-614 in scene 602. In some implementations, second XR device 620 can perform object recognition on the images to identify object types associated with physical objects 608-614, e.g., window, table, door, and chair, respectively. In some implementations, user 622 of second XR device 620 can manually enter the object types associated with physical objects 608-614 on second XR device 620. Second XR device 620 can generate object data associated with physical objects 608-614, and can generate scene data by storing the object data with reference to locations in scene 602 (e.g., locations corresponding to spatial anchors established in scene 602). Second XR device 620 can then render virtual checkers game 616 in view 600A such that it appears to be placed on physical object 610 (i.e., the table).

Figure 6B:
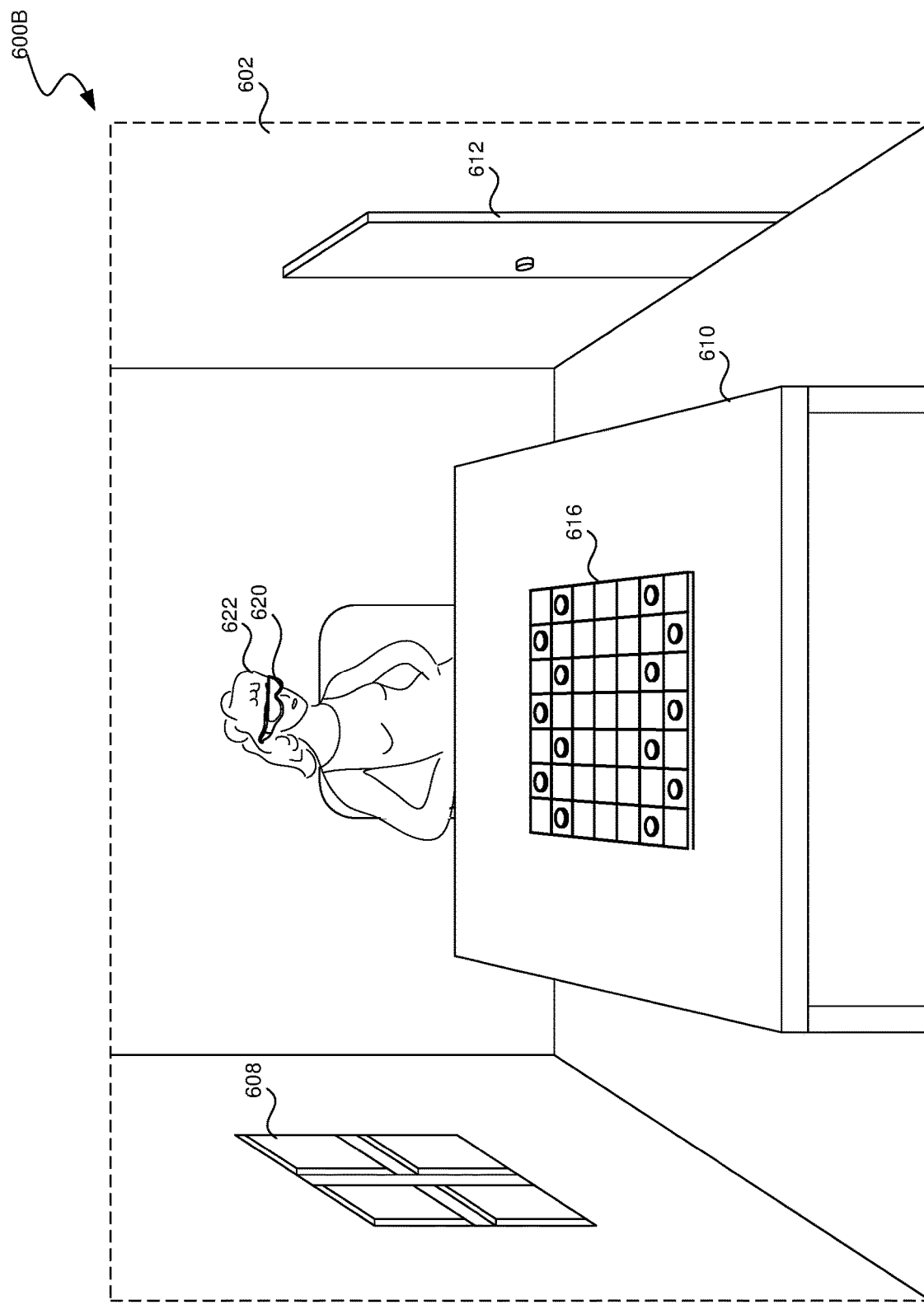
FIG. 6B is a conceptual diagram illustrating an example view from an artificial reality (XR) device that received scene data corresponding to a scene in a real-world environment.

FIG. 6B is a conceptual diagram illustrating an example view 600B from an XR device (e.g., first XR device 606 associated with user 604 in FIG. 6A) that received scene data corresponding to a scene 602 in a real-world environment. First XR device 606 can retrieve one or more spatial anchors for scene 602 in the real-world environment and align a coordinate frame in scene 602 with coordinate frames for second XR device 620 using the one or more spatial anchors. First XR device 606 can obtain scene data from second XR device 620 based on an association between one or more of the spatial anchors and the scene data (e.g., based on the locations of physical objects 608-614 with respect to the spatial anchors). First XR device 606 can then render virtual checkers game 616 in view 600B such that it appears to be placed on physical object 610 (i.e., the table), without having to itself scan scene 602 to generate the scene data. In some implementations, virtual checkers game 616 can be rendered in the same position on physical object 610 for both first XR device 606 and second XR device 620, albeit from different viewpoints respectively associated with user 604 and user 622.

FIG. 7 is a conceptual diagram illustrating an exemplary flow 700 for object recognition according to some implementations of the present technology. XR device 702 can capture object image 704; in this case, a doorway. For example, one or more image capture devices (e.g., one or more cameras) integral with and/or in operable communication with XR device 702 can capture object image 704 (and, in some implementations, images of other real-world objects) in the field-of-view of a user of XR device 702.

Some implementations can also receive contextual factors surrounding the object image 704, such as where the image was captured (e.g., in the living room, at a movie theater, at a restaurant, in an office, etc.), when the image was captured (e.g., morning, noon, night, late night, on a holiday, on a weekend, etc.), audio occurring when the image was captured (e.g., a user discussing or announcing his surroundings, conversations, etc.), what the user was doing when the image was captured (e.g., watching a movie, working on a computer, etc.), and/or any other contextual data that may be relevant to identifying an object type, such as environmental factors (e.g., the temperature, the weather, etc.). Some implementations can also receive user metadata, such as identifying information associated with the user (e.g., age, gender, nationality, ethnicity, height, weight, etc.), interests of the user (e.g., sports, games, movies, books, outdoors, etc.), object types previously or often seen by the user (or similar users, e.g., users having similar demographics), and/or the like.

XR device 702 can be, for example, an HMD, such as any one of HMD 200 of FIG. 2A, HMD 252 of FIG. 2B, and/or any other components of an XR system in operable communication with an HMD. In some implementations described herein, XR device 702 can be a "second XR device." Object image 704 can be fed into feature extractor 706 that can identify relevant features 708 in object image 704. The relevant features 708 can correspond to, for example, edges, corners, shapes, curvatures, colors, or textures, or any combination thereof. Feature 708 can be into machine learning model 714.

Machine learning model 714 can obtain training data 710 including labeled object types with identified features; for example, window 712A, doorway 712B, and floor 712C. Some implementations can train machine learning model 714 using a collection of images having known object types and applying a feature extraction algorithm (e.g., via feature extractor 706) to manually extract features of the image, such as edge or corner features, that can be used to differentiate between the object types. Some implementations can train machine learning model 714 by analyzing a large set of training images with known object types, contextual factors, and/or user metadata, and automatically learning the object types' inherent features. Some implementations can map the features of the training images into a classification space identifying the candidate object type associated with those features, to create training data 710. Some implementations can further include past feedback on whether previous object type predictions were correct within training data 710. Some implementations can repeat the training phase of machine learning model 714 until a suitable accuracy level is reached, e.g., as identified by applying a loss function, such as when a sufficient amount of training data 710 has been processed and predictions made by machine learning model 714 do not deviate too far from actual results.

Once trained, machine learning model 714 can generate an output using features 708, training data 710, and, in some implementations, any user metadata and/or contextual factors. In some implementations, machine learning model 714 can map features 708 as data points of an output vector in a classification space using training data 710. Using the output vector, machine learning model 714 can compare features 708 to training data 710 to generate a match score between features 708 and training data 710 in the classification space by calculating a distance between the output vector and the candidate object types in training data 710. The match score can be any numerical or textual value or indicator, such as a statistic or percentage.

In this case, machine learning model 714 can determine that the type of object in object image 704 has a highest match score with doorway 712B. Thus, in some implementations, features 708 do not necessarily have to match all of the features of doorway 712B; however, machine learning model 714 can determine that the identified features 708 in object image 704 are more similar to doorway 712B than to window 712A or floor 712C. In some implementations, machine learning model 714 can determine that features 708 have a match score above a predetermined threshold with doorway 712B.

Machine learning model 714 can output object data 716. In some implementations, machine learning model 714 can output object data 716 to XR device 702. Some implementations can receive feedback about the predicted object type. In some implementations, the feedback can be explicit, e.g., the user audibly announces that the predicted object type is incorrect and/or identifies the correct object type, the user selects a virtual button indicating that the predicted object type is correct or incorrect, the XR device captures an image with textual identification of the object type, etc. In some implementations, the feedback can be implicit, e.g., the user does not correct the predicted object type.

Some implementations can update machine learning model 714 and/or training data 710 based on any feedback. For example, based on the feedback data, some implementations can evaluate machine learning model 714 with metrics, for example. The metrics can include accuracy, precision, F1 score, Mean Squared Error, etc. Some implementations can feed these metrics back into machine learning model 714 to refine and update model 714, if necessary. In another example, some implementations can use the feedback data to identify whether the predicted object type was correct and incorrect (and, if incorrect, what the correct object type was, if available), and use that information as a comparison factor to update the model and/or the classification space. Some implementations can weigh the current or updated training data more heavily than the initial or past training data 710, as the later training data can be considered more relevant and/or accurate.

Object data 716 can indicate that object 704 has an object type of "doorway," which can be associated with location data 718 to make scene data 720. Scene data 720 can be output to another XR device 722 (e.g., "a first XR device," as used herein). XR device 722 can retrieve one or more spatial anchors for a scene in a real-world environment having scene data 720, with the one or more spatial anchors each defining a respective location in the scene corresponding to location data 718. XR device 722 can further align a coordinate frame in the scene with coordinate frames for XR device 702 using the one or more spatial anchors, and retrieve the scene data 720 based on the association between the at least one of the spatial anchors and scene data 720. XR device 722 can further render one or more virtual objects in the scene with respect to the one or more physical objects (e.g., the doorway in object image 704) on the aligned coordinate frame using scene data 720, as described further herein with respect to FIG. 5. Although illustrated as a single flow 700, it is contemplated that flow 700 can be performed multiple times and/or repeatedly, either consecutively or concurrently, as additional object images are received for a particular scene.

Thus, some implementations of the shared scene co-location system can include a machine learning component, such as a neural network, that is trained using a variety of data, including images of known object types, past object types seen by the user or similar users, metadata associated with the user, contextual factors, and/or whether the user identified a predicted object type as correct or incorrect. Some implementations can feed input data including an image of an object, user metadata, and/or contextual factors into the trained machine learning component, and based on the output, can generate a predicted object type. Some implementations provide this predicted object type to a user via a display on an XR device. Some implementations receive feedback about the predicted object type to further enhance the trained model.

A "machine learning model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the trained model can be a neural network with multiple input nodes that receive input data including an image of an object, any user metadata, and/or any contextual factors. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input that, once the model is trained, can be used to predict an object type in the image. In some implementations, such neural networks, known as deep neural networks, can have multiple layers of intermediate nodes with different configurations, can be a combination of models that receive different parts of the input and/or input from other parts of the deep neural network, or are convolutions or recurrent-partially using output from previous iterations of applying the model as further input to produce results for the current input.

A machine learning model can be trained with supervised learning, where the training data includes images of known object type, any user metadata, and/or any contextual factors as input and a desired output, such as a prediction of an object type. A current image of an object can be provided to the model. Output from the model can be compared to the desired output for that object type, and, based on the comparison, the model can be modified, such as by changing weights between nodes of the neural network or parameters of the functions used at each node in the neural network (e.g., applying a loss function). After applying each of the factors in the training data and modifying the model in this manner, the model can be trained to evaluate new input data.

Some implementations of the shared scene co-location system can include a deep learning component. A "deep learning model," as used herein with respect to object recognition, refers to a construct trained to learn by example to perform classification directly from images. The deep learning model is trained by using a large set of labeled data and applying a neural network as described above that includes many layers. With respect to object recognition from images, the deep learning model in some implementations can be a convolutional neural network (CNN) that is used to automatically learn an object's inherent features to identify the object. For example, the deep learning model can be an R-CNN, Fast R-CNN, or Faster-RCNN. In some implementations, object recognition can be performed using other object recognition approaches, such as template matching, image segmentation and blob analysis, edge matching, divide-and-conquer search, greyscale matching, gradient matching, pose clustering, geometric hashing, scale-invariant feature transform (SIFT), histogram of oriented gradients (HOG), region-based fully convolutional network (R-FCN), single shot detector (SSD), spatial pyramid pooling (SPP-net), etc.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for sharing scene data between multiple artificial reality devices, the method comprising:
retrieving, by a first artificial reality device, one or more spatial anchors for a scene in a real-world environment, the one or more spatial anchors each defining a respective location in the scene,
wherein at least one of the one or more spatial anchors is associated with scene data gathered by a second artificial reality device, the scene data being generated by storing object data, associated with one or more physical objects, having an identified object type from a set of object types defined as scene components, in the scene, wherein the object data is stored with reference to at least one of the one or more locations in the scene, such that the scene data is associated with at least one of the one or more spatial anchors;
aligning a coordinate frame for the scene, for the second artificial reality device, using the one or more spatial anchors;
obtaining the scene data based on the association between the at least one of the spatial anchors and the scene data; and
rendering one or more virtual objects in the scene with respect to the one or more physical objects on the aligned coordinate frame based on A) the object data and B) associated reference to the at least one of the one or more locations, in the scene, defined by the at least one of the one or more spatial anchors.

2. The method of claim 1, wherein the object type is identified by performing object recognition on one or more images of the scene captured by the second artificial reality device.

3. The method of claim 1, wherein the object type is identified manually by a user of the second artificial reality device.

4. The method of claim 1, wherein the one or more virtual objects are rendered in the scene simultaneously by the first artificial reality device and the second artificial reality device.

5. The method of claim 1, wherein the scene data is obtained from the second artificial reality device.

6. The method of claim 1, wherein the scene data is gathered by the second artificial reality device by scanning the scene using one or more image capture devices.

7. A non-transitory computer-readable storage medium storing instructions that, when executed by a computing system, cause the computing system to perform a process for sharing scene data between multiple artificial reality devices, the process comprising:
retrieving, by a first artificial reality device, one or more spatial anchors for a scene in a real-world environment, the one or more spatial anchors each defining a respective location in the scene,
wherein at least one of the one or more spatial anchors is associated with scene data gathered by a second artificial reality device, the scene data being generated by storing object data, associated with one or more physical objects in the scene, wherein the object data is stored with reference to at least one of the one or more locations in the scene, such that the scene data is associated with at least one of the one or more spatial anchors;
aligning a coordinate frame for the scene, for the second artificial reality device, using the one or more spatial anchors;
obtaining the scene data based on the association between the at least one of the spatial anchors and the scene data; and
rendering one or more virtual objects in the scene with respect to the one or more physical objects on the aligned coordinate frame based on A) the object data and B) associated reference to the at least one of the one or more locations, in the scene, defined by the at least one of the one or more spatial anchors.

8. The non-transitory computer-readable storage medium of claim 7,
wherein the one or more physical objects have an identified object type from a set of object types defined as scene components, and
wherein the object data is stored with reference to the one or more locations in the scene.

9. The non-transitory computer-readable storage medium of claim 8, wherein the object type is identified by performing object recognition on one or more images of the scene captured by the second artificial reality device.

10. The non-transitory computer-readable storage medium of claim 8, wherein the object type is identified manually by a user of the second artificial reality device.

11. The non-transitory computer-readable storage medium of claim 7, wherein the one or more virtual objects are rendered in the scene simultaneously by the first artificial reality device and the second artificial reality device.

12. The non-transitory computer-readable storage medium of claim 7, wherein the scene data is obtained from the second artificial reality device.

13. The non-transitory computer-readable storage medium of claim 7, wherein the scene data is gathered by the second artificial reality device by scanning the scene using one or more image capture devices.

14. A computing system for sharing scene data between multiple artificial reality devices, the computing system comprising:
one or more processors; and
one or more memories storing instructions that, when executed by the one or more processors, cause the computing system to perform a process comprising:
retrieving, by a first artificial reality device, one or more spatial anchors for a scene in a real-world environment, the one or more spatial anchors each defining a respective location in the scene,
wherein at least one of the one or more spatial anchors is associated with scene data gathered by a second artificial reality device, the scene data being generated by storing object data, associated with one or more physical objects in the scene, wherein the object data is stored with reference to at least one of the one or more locations in the scene, such that the scene data is associated with at least one of the one or more spatial anchors;
aligning a coordinate frame for the scene, for the second artificial reality device, using the one or more spatial anchors;
obtaining the scene data based on the association between the at least one of the spatial anchors and the scene data; and rendering one or more virtual objects in the scene with respect to the one or more physical objects on the aligned coordinate frame based on A) the object data and B) associated reference to the at least one of the one or more locations, in the scene, defined by the at least one of the one or more spatial anchors.

15. The computing system of claim 14,
wherein the one or more physical objects have an identified object type from a set of object types defined as scene components, and
wherein the object data is stored with reference to the one or more locations in the scene.

16. The computing system of claim 15, wherein the object type is identified by performing object recognition on one or more images of the scene captured by the second artificial reality device.

17. The computing system of claim 15, wherein the object type is identified manually by a user of the second artificial reality device.

18. The computing system of claim 14, wherein the one or more virtual objects are rendered in the scene simultaneously by the first artificial reality device and the second artificial reality device.

19. The computing system of claim 14, wherein the scene data is obtained from the second artificial reality device.

20. The computing system of claim 14, wherein the scene data is gathered by the second artificial reality device by scanning the scene using one or more image capture devices.

* * * * *